United States Patent [19]

Katto et al.

[11] Patent Number: 4,636,553

[45] Date of Patent: * Jan. 13, 1987

[54] THERMOPLASTIC RESIN COMPOSITION

[75] Inventors: Takayuki Katto; Yasumasa Komatsu; Zenya Shiiki, all of Fukushima, Japan

[73] Assignee: Kureha Kagaku Kogyo Kabushiki Kaisha, Tokyo, Japan

[*] Notice: The portion of the term of this patent subsequent to May 8, 2001 has been disclaimed.

[21] Appl. No.: 618,662

[22] Filed: Jun. 8, 1984

[30] Foreign Application Priority Data

Jun. 14, 1983 [JP] Japan .................................. 58-106098

[51] Int. Cl.$^4$ ...................... C08L 51/06; C08L 55/02; C08L 69/00
[52] U.S. Cl. ....................................... 525/67; 525/68; 525/75
[58] Field of Search ................... 525/67, 68, 316, 303, 525/75

[56] References Cited

U.S. PATENT DOCUMENTS 3,130,177  4/1964  Grabowski ............................ 525/67
3,438,923  4/1969  Strobel ................................ 525/316
4,447,578  5/1984  Katto et al. ............................ 525/84

Primary Examiner—Jacob Ziegler
Attorney, Agent, or Firm—Cushman, Darby & Cushman

[57] ABSTRACT

A thermoplastic resin composition of high heat resistance and high impact resistance is described, comprising: (A) 5 to 85% by weight of a copolymer prepared from 40 to 85% by weight of a monomer mixture of 2-isopropenylnaphthalene (2-IPN) and α-methylstyrene (α-MeSt), the proportion of 2-IPN being 5 to 70% by weight based on the total weight of 2-IPN and α-MeSt, 7.5 to 35% by weight of acrylonitrile, and 0 to 40% by weight of a vinyl monomer copolymerizable with the foregoing monomers; (B) 1 to 40% by weight of a graft copolymer prepared by graft polymerization of 15 to 50 parts by weight of at least one monomer as the graft component selected from the group consisting of methacrylic acid alkyl esters, acrylic acid alkyl esters, aromatic vinyl compounds, and vinyl cyan compounds onto 50 to 85 parts by weight of a butadiene-based rubber or alkyl acrylate-based rubber as the rubber component, provided that the sum of the graft and rubber components is 100 parts by weight; and (C) 10 to 90% by weight of a polycarbonate.

10 Claims, No Drawings

THERMOPLASTIC RESIN COMPOSITION

FIELD OF THE INVENTION

The present invention relates to a thermoplastic resin composition having superior heat resistance and impact resistance. More particularly, it is concerned with a thermoplastic resin composition of high heat resistance and high impact resistance, comprising a copolymer containing high proportions of 2-isopropenylnaphthalene and α-methylstyrene, a rubber-containing graft copolymer, and a polycarbonate.

BACKGROUND OF THE INVENTION

ABS resins are widely used because of their good workability and superior impact resistance but have a disadvantage of being poor in heat resistance which is usually expressed in terms of a heat distortion temperature.

Polycarbonates are superior in impact strength, heat resistance, and transparency. However, they have disadvantages in that molten fluidity is poor, the impact strength of moldings of increased thickness is low, and they are expensive.

In order to compensate for the foregoing defects of ABS resins and polycarbonates, it has been extensively attempted to blend the ABS resins and polycarbonates together; see, for example, Japanese Patent Publication No. 15225/63. That is, the heat resistance of ABS resins is improved by blending with polycarbonates, and the workability of polycarbonates is improved by blending with ABS resins.

In accordance with conventional methods, however, if the intent is to significantly increase the heat resistance of ABS resins, it is inevitably necessary to add large amounts of polycarbonates. This will increase the production costs and reduce workability which is one of the desirable features of ABS resins. On the other hand, if the intent is to improve the workability of polycarbonates by adding ABS resins, the heat resistance of the polycarbonates is reduced to undesirably low levels.

In order to overcome the foregoing problems, various compositions have been proposed, including a composition comprising a graft copolymer prepared by graft polymerization of styrene, acrylonitrile and methyl methacrylate onto a rubber, an α-methylstyrene/methyl methacrylate/acrylonitrile copolymer, and 50% or less of a polycarbonate (see Japanese Patent Publication No. 504/77); and a composition comprising a graft copolymer prepared by graft polymerization of vinyl monomers onto a rubber, an α-methylstyrene/acrylonitrile copolymer and 50% or less of a polycarbonate (see Japanese Patent Application (OPI) Nos. 83540/82 and 55945/82). The term "OPI" as used herein means a published unexamined Japanese patent application. These compositions, however, fail to sufficiently overcome the above-described problems.

SUMMARY OF THE INVENTION

The present invention is intended to overcome the above-described problems and the object of the present invention is to provide a thermoplastic resin composition which is well balanced in the properties of heat resistance, impact resistance and workability. It has been found that these objects are attained by compounding a polycarbonate, a specific copolymer having very high heat resistance, and a rubber graft copolymer.

The present invention relates to a thermoplastic resin composition of high heat resistance and high impact resistance, comprising:

5 to 85% by weight of a copolymer (A) prepared by copolymerizing 40 to 85% by weight of a monomer mixture of 2-isopropenylnaphthalene and α-methylstyrene, the proportion of 2-isopropenylnaphthalene being 5 to 70% by weight based on the total weight of 2-isopropenylnaphthalene and α-methylstyrene, 7.5 to 35% by weight of acrylonitrile, and 0 to 40% by weight of a vinyl monomer copolymerizable with the foregoing monomers;

1 to 40% by weight of a graft copolymer (B) prepared by polymerizing 15 to 50 parts by weight of at least one monomer (as the graft component) selected from the group consisting of aromatic vinyl compounds, vinyl cyan compounds, methacrylic acid alkyl esters, and acrylic acid esters in the presence of 50 to 85 parts by weight of a butadiene-based rubber or alkyl acrylate-based rubber (as the rubber component), provided that the sum of the graft and rubber components is 100 parts by weight; and 10 to 90% by weight of a polycarbonate (C).

DETAILED DESCRIPTION OF THE INVENTION

One of the features of the present invention is that even if only a small amount polycarbonate is blended in order to improve the heat resistance of ABS resins, the resulting composition is superior in heat resistance and impact resistance and further exhibits good workability.

Another feature of the present invention is that even if the copolymer (A) and graft copolymer (B), as described above, are added in order to improve the workability of polycarbonate, the heat resistance of the resulting composition is only slightly reduced.

In the present invention, it is of great significance that a copolymer made mainly from 2-isopropenylnaphthalene and α-methylstyrene (α-MeSt) is used in place of copolymers containing α-methylstyrene as a major ingredient which have heretofore been used. If such a 2-isopropenylnaphthalene (2-IPN)-containing copolymer is used, the resulting composition is greatly increased in heat resistance as compared with α-MeSt-based copolymers not containing 2-IPN. Therefore, even if the amount of polycarbonate added is small, a composition can be obtained having superior heat resistance, impact resistance and workability. Furthermore, the mold workability of the polycarbonate resin can be improved without causing a serious drop in the heat resistance of the polycarbonate. Thus, it will be understood that surprisingly the 2-IPN component greatly contributes to the heat resistance.

The present invention will hereinafter be explained in detail. Copolymer (A) is prepared from 2-IPN, α-MeSt, acrylonitrile (AN), and if necessary, a small amount of a vinyl monomer copolymerizable with the foregoing monomers.

2-IPN is an important component in that among the above-described three monomers, it most significantly contributes to the heat resistance. α-MeSt is also a component contributing to the heat resistance. Thus, it is desirable from a viewpoint of heat resistance to increase the total amount of 2-IPN and α-MeSt as much as possible. However, if the total amount of 2-IPN and α-MeSt is too large, the yield in the copolymerization will drop. Thus, the total amount of 2-IPN and α-MeSt is from 40 to 85% by weight, preferably from 45 to 80% by weight, based on the total weight of the monomer mixture. If the total amount of 2-IPN and α-MeSt is less than 40% by weight, it is not possible to increase the heat resistance, whereas if it is in excess of 85% by weight, the yield is reduced. 2-IPN is, as described above, a component particularly greatly contributing to the heat resistance and is capable of providing higher heat resistance than α-MeSt. The proportion of 2-IPN in the 2-IPN/α-MeSt mixture is from 5 to 70% by weight, preferably from 10 to 60% by weight, based on the total weight of the mixture. If the proportion of 2-IPN is less than 5% by weight, the desired high heat resistance cannot be realized, whereas if it is in excess of 70% by weight, polymerizability is somewhat reduced.

In the preparation of the copolymer (A), it is preferable to employ an emulsion polymerization method in order that the amounts of 2-IPN and α-MeSt contributing to heat resistance are increased as much as possible and, furthermore, the rate of polymerization and yield are increased. AN has the effect of increasing the polymerizability of the monomer mixture in the emulsion polymerization and furthermore of increasing the impact strength of the resulting copolymer. If, however, AN is used in excessive amounts, the heat resistance is reduced. Thus, the amount of AN used is from 7.5 to 35% by weight, and preferably from 10 to 30% by weight.

Vinyl monomers copolymerizable with the foregoing monomers include St, MMA, methacrylonitrile, methacrylic acid, and acrylic acid. This vinyl monomer can be used in small amounts if necessary to improve a rate of polymerization and to provide other properties. Usually it is used in an amount of from 0 to 40% by weight.

In the preparation of copolymer (A), as described above, it is most preferred to employ emulsion polymerization. This emulsion polymerization can be performed by known procedures using peroxides, emulsifying agents, polymerization accelerators, and so forth. The emulsion polymerization process may be performed in any suitable manner. For example, the monomer mixture is added at the same time to the reaction system and polymerized, or the monomer mixture is divided and added in several portions, or one or more monomer mixtures are continuously introduced into the reaction system and polymerized. For the purpose of adjusting the degree of polymerization of the copolymer (A), a chain transfer agent, such as mercaptans, can be used.

Graft copolymer (B), which is the other component of the thermoplastic resin composition of the present invention and added as an impact strength-increasing agent, is prepared by adding 15 to 50 parts by weight of a monomer mixture of one or more of aromatic vinyl compounds, vinyl cyanides, methacrylic acid alkyl esters, and acrylic acid alkyl esters to 50 to 85 parts by weight of a butadiene-based rubber or alkyl acrylate-based rubber and then polymerizing the monomer mixture in the presence of the butadiene-based rubber or alkyl acrylate-based rubber.

The butadiene-based rubber or alkyl acrylate-based rubber may contain small amounts of cross-linking agents and chain transfer agents. At the time of graft polymerization, small amounts of cross-linking agents or chain transfer agents may be incorporated. When the alkyl acrylate-based rubber is used, the final composition is superior in weather resistance to a composition containing the butadiene-based rubber.

Aromatic vinyl compounds which can be used as the graft component for the graft copolymer (B) include styrene, α-methylstyrene, chlorostyrene, tert-butyl-styrene, and p-methylstyrene. Of these compounds, styrene is most preferred. As the vinyl cyanide, acrylonitrile is most preferred. In addition, methacrylonitrile can be used. Preferred examples of methacrylic acid alkyl esters are those compounds in which the alkyl group has from 1 to 4 carbon atoms, such as MMA, n-butyl methacrylate, and ethyl methacrylate. Preferred examples of acrylic acid alkyl esters are those compounds in which the alkyl group has from 1 to 8 carbon atoms, such as methyl acrylate, ethyl acrylate, and butyl acrylate.

The graft component as used herein is at least one monomer selected from the group consisting of the above-described aromatic vinyl compounds, vinyl cyanides, methacrylic acid alkyl esters and acrylic acid alkyl esters. In order to increase impact resistance, the graft component preferably comprises 0 to 100% by weight of a methacrylic acid alkyl ester and/or an acrylic acid alkyl ester, 0 to 85% by weight of an aromatic vinyl compound, and 0 to 40% by weight of a vinyl cyanide. Typical examples are a styrene-acrylonitrile mixture, methyl methacrylate alone, a methyl methacrylate-styrene mixture, and a methyl methacrylate-styrene-acrylonitrile mixture.

The butadiene-based rubber to be used as the rubber component for the graft copolymer (B) is polybutadiene or a butadiene copolymer prepared from a major proportion of butadiene and one or more vinyl monomers copolymerizable with butadiene. Similarly, the alkyl acrylate-based rubber is a polyalkyl acrylate or an alkyl acrylate copolymer prepared from a major proportion of alkyl acrylate and one or more monomers copolymerizable with alkyl acrylate. Preferred examples of alkyl acrylates are those compounds in which the alkyl group has 4 to 8 carbon atoms, such as butyl acrylate and octyl acrylate.

Cross-linking agents which can be used in the polymerization of the rubber or graft component are those compounds copolymerizable with butadiene or alkyl acrylates. Examples are divinylbenzene, ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, trimethylolpropane trimethacrylate or acrylate, 1,3-butanediol dimethacrylate, and 1,3-butanediol diacrylate.

As chain transfer agents, known compounds such as n-octylmercaptan, n-dodecylmercaptan, and tert-dodecylmercaptan can be used.

Graft copolymer (B) can be prepared by polymerization procedures that are commonly used. Especially preferred is an emulsion polymerization method. To further improve the impact resistance of the composition, it is preferred to use a rubber latex having a mean particle size of at least 1,500 Å. This rubber latex can be prepared by known emulsion polymerization procedures. These large particle sized rubber latexes can be prepared by known techniques such as a multistage seed polymerization method and a micro-coagulation method in which small particle sized rubber latexes are coagulated with additives such as acids, salts, and water-soluble polymers. The micro-coagulation method is simpler in operation to conduct.

Micro-coagulation can be carried out by known procedures using inorganic acids such as hydrochloric acid, organic acids such as tartaric acid, malic acid and acetic acid, water-soluble polymers such as polyethylene oxide and polyvinyl alcohol, salt, metal salts such as magnesium chloride, combinations of peroxides and formaldehydesulfoxylic acid salts, and so forth.

With regard to the ratio of the rubber component to the graft component, graft copolymer (B) is prepared from 50 to 85 parts by weight of the rubber component and 15 to 50 parts by weight of the graft component, provided that the sum of the rubber and graft components is 100 parts by weight, in order to increase the effect of imparting impact resistance and further to facilitate post-treatments such as salting and drying. Graft polymerization may be performed in either one stage or multiple stages. Moreover, it may be performed while continuously feeding the monomer mixture.

The polycarbonate (C) as used herein is an aromatic polycarbonate containing an aromatic radical in the main chain thereof, which is prepared by procedures such as the ester exchange method and the phosgene method. For example, polycarbonate (C) can be prepared by reacting bisphenols and phosgene or diaryl carbonates. A preferred example is a polycarbonate of 2,2'-bis(4-hydroxyphenyl)propane. In addition, polycarbonates prepared from bisphenols substituted with, e.g., halogen or an alkyl group in the phenyl group can be used.

Heat resistance, impact resistance and mold workability of the thermoplastic resin composition of the present invention, comprising copolymer (A), graft copolymer (B) and polycarbonate (C), vary considerably depending not only on the composition of each of the components (A), (B) and (C) but also as to the ratio of component (A) to component (B) to component (C). In order to obtain the objects of the present invention, it is required that the thermoplastic resin composition of the present invention comprise 5 to 85% by weight of copolymer (A), 1 to 40% by weight of graft copolymer (B) and 10 to 90% by weight of the polycarbonate. If the proportion of the copolymer (A) is less than 5% by weight, molten fluidity is reduced, whereas if it is in excess of 85% by weight, impact strength is reduced. If the proportion of the graft copolymer (B) is less than 1% by weight, the impact strength is low, whereas if it is in excess of 40% by weight, both the heat resistance and molten fluidity are reduced. Also, if the proportion of the polycarbonate (C) is less than 10% by weight, heat resistance and impact resistance are reduced, whereas if it is in excess of 90% by weight, molten fluidity is reduced. When, in particular, it is desired to prepare a composition having superior molten fluidity, it is preferred for the proportion of the polycarbonate (C) to be controlled within the range of from 10 to 60% by weight.

Components (A), (B) and (C) can be blended together by known techniques. For example, components (A), (B) and (C) are powdered or pelletized and mixed in commonly used processing machines such as extruders, Banbury mixers and mixing rolls. If desired, flame-retardants, stabilizers, lubricants, fillers, and similar conventional additives and modifiers can be added.

The thermoplastic resin composition of the present invention is superior in heat resistance, impact resistance, mechanical characteristics and workability and, therefore, is useful as a material for use in injection molding and extrusion molding.

The following Examples and Comparative Examples are given to illustrate the present invention in greater detail. In these Examples, the solution viscosity was measured under conditions of solvent chloroform, concentration 4 g/l, and temperature 30° C. The glass transition temperature was measured in a nitrogen ($N_2$) atmosphere at a rate of elevation of temperature of 10° C./min. by the use of a differential scanning calorimeter (DSC) produced by Rigaku Denki Co., Ltd. The latex particle size was measured by the use of a Coulter Nano-sizer produced by Coulter Electronics Ltd. All percents and parts are by weight and temperatures in centigrade degrees unless otherwise indicated.

EXAMPLES 1 TO 7 AND COMPARATIVE EXAMPLES 1 TO 8

Preparation of Copolymer (A)

A polymerization reactor was charged with compounds as shown below and, after replacement of the atmosphere with $N_2$, they were heated to 60° C. in a stream of $N_2$.

| Component | Amount (parts) |
|---|---|
| Water | 250 |
| Sodium Formaldehydesulfoxylate | 0.4 |
| Sodium Dodecylbenzenesulfonate | 1.5 |
| Ferrous Sulfate | 0.0025 |
| Disodium Ethylenediaminetetraacetate | 0.01 |

The monomer mixtures as shown in Table 1 were each continuously introduced into the polymerization reactor over a period of 6 hours. After the addition was completed, the resulting mixture was further stirred at 60° C. for 1 hour.

Each latex as prepared above was salted out with aluminum sulfate, then neutralized, washed with water, and filtered off. Copolymers A-1, A-2, and A-4 were recovered by extraction with methanol followed by removal of the remaining monomers. For Copolymers A-3 and A-5, the wet cake was dried in the fluidized drying to remove the remaining monomers. These copolymers were measured for yield, glass transition temperature, and solution viscosity. The results are shown in Table 1. Copolymers A-4 and A-5 are comparative examples having a monomer composition not falling within the range of the present invention.

It can be seen from Table 1 that if 2-IPN is used as a copolymerization component, the glass transition temperature of the resulting copolymer is greatly increased.

TABLE 1

| Copolymer (A) | Monomer Composition (parts) | | | | | Yield (%) | Tg (°C.) | $\eta_{sp}/c$ (dl/g) | Remarks (parts) |
|---|---|---|---|---|---|---|---|---|---|
| | α-MeSt | 2-IPN | AN | MMA | t-DM*3 | | | | |
| A-1 | 65 | 10 (13.3)*1 | 25 | — | 0.2 | 88 | 144 | 0.71 | CHP*2 0.4 |
| A-2 | 62.5 | 11 (15) | 17.5 | 9 | 0.15 | 91 | 146 | 0.59 | CHP*2 0.4 |
| A-3 | 55 | 10 (15.4) | 10 | 25 | 0.15 | 89 | 150 | 0.51 | CHP*2 0.3 |
| A-4+ | 75 | 0 (0) | 25 | — | 0.3 | 88 | 138 | 0.77 | CHP*2 0.4 |

TABLE 1-continued

| Copolymer | Monomer Composition (parts) | | | | | Yield | Tg | ηsp/c | Remarks |
|---|---|---|---|---|---|---|---|---|---|
| (A) | α-MeSt | 2-IPN | AN | MMA | t-DM*3 | (%) | (°C.) | (dl/g) | (parts) |
| A-5+ | 65 | 0 (0) | 10 | 25 | 0.3 | 90 | 141 | 0.53 | CHP*2 0.3 |

*1The figures in parentheses indicate the percentage of 2-IPN based on the total weight of α-MeSt and 2-IPN.
*2CHP = Cumene hydroperoxide (polymerization catalyst)
*3t-DM = Tert-dodecylmercaptan
+Not according to the present invention.

Preparation of Graft Copolymer (B)

Graft Copolymer B-1

A polymerization reactor was charged with the compounds as shown below and polymerized at 60° C. for 10 hours.

|  | Amount (parts) |
|---|---|
| Water | 170 |
| FeSO4.7H2O | 0.00195 |
| EDTA.Na | 0.00325 |
| Sodium Pyrophosphate | 0.1085 |
| Sodium Formaldehydesulfoxylate (SFS) | 0.03 |
| Potassium Oleate (OLK) | 0.9 |
| Butadiene (Bu) | 55 |
| Styrene (St) | 10 |
| TDM | 0.195 |
| CHP | 0.12 |

The above-prepared rubber latex had a particle size of 820 Å.

The temperature of 236.3 parts of the rubber latex (rubber content: 65 parts) was raised to 60° C., and 5 parts of 8.8% aqueous solution of SFS and 0.65 part of a 35% aqueous solution of hydrogen peroxide were added thereto. The resulting mixture was stirred for 5 minutes and then stirring was stopped. After 2.5 hours, 9 parts of a 3% aqueous NaOH solution, 0.5 part of OLK and 100 parts of water were added, and the pH was 11.5. The latex rubber particle diameter as determined by the Coulter Nano-sizer was 2,600 Å.

Added to the micro-coagulated rubber latex were 12.25 parts of methyl methacrylate (MMA), 5.25 parts of St, 0.088 part of TDM, 0.06 part of CHP, 0.15 part of SFS, and 1 part of water which were then polymerized at 60° C. for 4 hours. In addition, 12.25 parts of MMA, 5.25 parts of St, 0.088 part of TDM, 0.06 part of CHP, 0.03 part of SFS, and 0.2 part of water were added, and polymerization was continued at 60° C. for 7 hours. Three hours after the start of the polymerization, 0.03 part of SFS and 0.2 part of water were added.

A small amount of phenol-based antioxidant was added. On adding hydrochloric acid, precipitation occurred, yielding an MMA-St-Bu graft copolymer (Graft Copolymer B-1). The yield was 99%.

Graft Copolymer B-2

To the same micro-coagulated rubber latex as used in the preparation of the Graft Copolymer B-1 in the amount of rubber content 65 parts were added 0.065 part of dioctyl sodium sulfosuccinate, 12.25 parts of MMA, 5.25 parts of St, 0.088 part of TDM, 0.06 part of CHP, 0.15 part of SFS, and 1 part of water which were then polymerized at 60° C. for 6 hours.

In addition, 13.1 parts of St, 4.4 parts of AN, 0.088 part of TDM, 0.06 part of CHP, 0.03 part of SFS, and 1 part of water were added to the latex, and polymerization was continued at 60° C. for 7 hours. Three hours after the start of the polymerization, 0.03 part of SFS and 1 part of water were added.

The same post-treatment as in the preparation of the Graft Copolymer B-1 was applied, yielding an AN-MMA-St-Bu graft copolymer (Graft Copolymer B-2). The yield was 98.5%.

Graft Copolymer B-3

A polymerization reactor was charged with the compounds as shown below and polymerized at 60° C. for 9 hours.

|  | Amount (parts) |
|---|---|
| Water | 170 |
| FeSO4.7H2O | 0.00195 |
| EDTA.Na | 0.00325 |
| Sodium Pyrophosphate | 0.1085 |
| SFS | 0.03 |
| OLK | 0.9 |
| n-Butyl Acrylate | 70 |
| Ethylene Glycol Dimethacrylate (EDMA) | 0.75 |
| Diisopropylbenzene Hydroperoxide (HPO) | 0.12 |

The thus-prepared rubber latex was subjected to a micro-coagulated treatment using an aqueous solution of hydrochloric acid at 60° C. to form a rubber latex having a particle size of 2,200 Å (as determined by the use of the Coulter Nano-sizer). To the micro-coagulated rubber latex were added 3.75 parts of MMA, 8.25 parts of St, 3 parts of AN, 0.03 part of EDMA, 0.06 part of HPO, 0.03 part of SFS, and 1 part of water, which were then polymerized at 60° C. for 4 hours. In addition, 13.5 parts of MMA, 1.5 parts of St, 0.02 part of EDMA, 0.03 part of HPO, 0.015 part of SFS, and 1 part of water, and polymerization was continued at 60° C. for 6 hours.

The rubber latex was precipitated with acid and then dried, yielding an alkyl acrylate-based rubber-containing graft copolymer (Graft Copolymer B-3).

Preparation of the Thermoplastic Resin Composition

Copolymer (A) and graft copolymer (B) as prepared above and polycarbonate (C), a polycarbonate produced by Teijin Kasei Co., Ltd. and sold under the trade name of Panlite K-1300W, were fully dried, blended, and then pelletized by extruding from an extruder at 270° C.

These pellets were dried and then injection-molded to form a test specimen for a physical property test. The specimen was subjected to the test, and the results are shown in Table 2.

The Izod impact strength was measured according to ASTM D-256, and the heat distortion temperature according to ASTM D-648. The melt viscosity was measured by the use of a Koka-type flow tester (nozzle: 1.0 mm (diameter)×1.0 mm (length); load: 100 kg).

TABLE 2

| Run No. | Copolymer (A) Type | Copolymer (A) Amount (%) | Graft Copolymer (B) Type | Graft Copolymer (B) Amount (%) | Poly-carbonate (%) | Heat* Distortion Temperature (°C.) | Izod Impact** Strength (kg-cm/cm²) | Melt Viscosity 260° C. (poises) | Melt Viscosity 270° C. (poises) |
|---|---|---|---|---|---|---|---|---|---|
| Example 1 | A-1 | 53.8 | B-2 | 16.2 | 30 | 124 | 29 | — | — |
| Example 2 | A-1 | 61.5 | B-2 | 18.5 | 20 | 123 | 18 | — | — |
| Comparative Example 1 | A-1 | 76.9 | B-2 | 23.1 | 0 | 120 | 9 | — | — |
| Comparative Example 2 | A-4 | 53.8 | B-2 | 16.2 | 30 | 119 | 35 | — | — |
| Example 3 | A-2 | 48.4 | B-2 | 21.6 | 30 | 122 | 37 | — | — |
| Comparative Example 3 | A-2 | 69.2 | B-2 | 30.8 | 0 | 118 | 11 | — | — |
| Example 4 | A-3 | 48.4 | B-1 | 21.6 | 30 | 123 | 35 | $5.8 \times 10^3$ | — |
| Example 5 | A-3 | 55.4 | B-1 | 24.6 | 20 | 121 | 24 | $5.7 \times 10^3$ | — |
| Comparative Example 4 | A-3 | 69.2 | B-1 | 30.8 | 0 | 118 | 10 | $5.4 \times 10^3$ | — |
| Comparative Example 5 | A-5 | 48.4 | B-1 | 21.6 | 30 | 118 | 38 | $5.3 \times 10^3$ | — |
| Example 6 | A-3 | 20.8 | B-1 | 9.2 | 70 | 130 | 55 | $9.8 \times 10^3$ | $5.6 \times 10^3$ |
| Comparative Example 6 | — | — | — | — | 100 | 137 | 86 | $5.1 \times 10^4$ | $2.5 \times 10^4$ |
| Comparative Example 7 | A-5 | 20.8 | B-1 | 9.2 | 70 | 127 | 56 | — | $5.7 \times 10^3$ |
| Example 7 | A-1 | 20 | B-3 | 10 | 70 | 129 | 48 | — | $5.3 \times 10^3$ |
| Comparative Example 8 | A-4 | 20 | B-3 | 10 | 70 | 126 | 49 | — | $5.1 \times 10^3$ |

*⅛ inch, 18.6 kg/cm²
**⅛ inch notched, 23° C.

Comparative Examples 1, 3 and 4 are directed to comparative resin compositions not containing the polycarbonate (C). For these comparative resin compositions, both the heat distortion temperature and impact strength are lower than those of the present invention. In Comparative Examples 2 and 5, the composition of the copolymer (A) is outside the range of the present invention, and the heat distortion temperature is lower than those of Examples 1 and 4.

Comparative Example 6 is directed to a comparative resin composition consisting of the polycarbonate (C) alone. Although the heat distortion temperature and impact strength are high, the melt viscosity is high. Thus, the comparative resin composition is difficult to mold. In Examples 6 and 7, and Comparative Examples 7 and 8, the melt viscosity is intended to decrease by adding small amounts of the copolymer (A) and graft copolymer (B). In Comparative Examples 7 and 8, however, since the composition of the copolymer (A) is not within the range of the present invention, although the melt viscosity is lowered, the heat distortion temperature is also more decreased than in Examples 6 and 7.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising:
   5 to 85% by weight of a copolymer (A) prepared by copolymerizing 40 to 85% by weight of a monomer mixture of 2-isopropenylnaphthalene and α-methylstyrene, the proportion of 2-isopropenylnaphthalene being 5 to 70% by weight based on the total weight of 2-isopropenylnaphthalene and α-methylstyrene, 7.5 to 35% by weight of acrylonitrile, and 0 to 40% by weight of a vinyl monomer copolymerizable other than α-methylstyrene, acrylonitrile or 2-isopropenylnaphthalene with the foregoing monomers;
   1 to 40% by weight of a graft copolymer (B) prepared by emulsion polymerizing 15 to 50 parts by weight of
   a graft monomer component consisting essentially of from 0 to 100% by weight of a methacrylic acid alkyl ester, an acrylic acid alkyl ester or mixtures thereof, from 0 to 85% by weight of an aromatic vinyl compound, and from 0 to 40% by weight of a vinyl cyanide compound in the presence of
   50 to 85 parts by weight of a butadiene-containing rubber as the rubber component, provided that the sum of the graft component and rubber component is 100 parts by weight; and
   10 to 90% by weight of a polycarbonate (C).

2. The thermoplastic resin composition of claim 1, in which the total monomer mixture of copolymer (A) contains from 45 to 80% by weight of 2-isopropenylnaphthalene and α-methylstyrene.

3. The thermoplastic resin composition of claim 1, in which the proportion of 2-isopropenyl-naphthalene is from 10 to 60% by weight based on the total weight of 2-isopropenylnaphthalene and α-methylstyrene.

4. The thermoplastic resin composition of claim 1, in which the total monomer mixture of copolymer (A) contains from 10 to 30% by wegith acrylonitrile.

5. The thermoplastic resin composition of claim 1, in which copolymer (A) contains at least one of styrene, methyl methacrylate, methacrylonitrile, methacrylic acid or acrylic acid as the vinyl monomer component.

6. The thermoplastic resin composition of claim 1, in which the methacrylic acid alkyl esters in the graft component of a graft copolymer (B) have an alkyl group containing 1 to 4 carbon atoms.

7. The thermoplastic resin composition of claim 1, in which the acrylic acid alkyl esters in the graft component of a graft copolymer (B) have an alkyl group containing 1 to 8 carbon atoms.

8. The thermoplastic resin composition of claim 1, in which the rubber component of graft copolymer (B) is polybutadiene or a butadiene copolymer containing a major proportion of butadiene and the balance of at least one vinyl monomer copolymerizable with butadiene.

9. The thermoplastic resin composition of claim 1, containing from 10 to 60% by weight of polycarbonate (C).

10. A molded article of the thermoplastic resin composition of claim 1.

* * * * *